US009728075B2

(12) United States Patent
Lin et al.

(10) Patent No.: US 9,728,075 B2
(45) Date of Patent: Aug. 8, 2017

(54) DISTRIBUTED AUTOMATIC NOTIFICATION METHOD FOR ABNORMALITY IN REMOTE MASSIVE MONITORS

(71) Applicant: NATIONAL APPLIED RESEARCH LABORATORIES, Taipei (TW)

(72) Inventors: Yun-Te Lin, Hsinchu (TW); Yung-Hsiang Huang, Hsinchu (TW); Sheng-Wen Wang, Hsinchu (TW); Jih-Sheng Chang, Hsinchu (TW); Yi-Hao Hsiao, Hsinchu (TW); Fang-Pang Lin, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 0 days.

(21) Appl. No.: 14/803,219

(22) Filed: Jul. 20, 2015

(65) Prior Publication Data

US 2016/0314590 A1 Oct. 27, 2016

(30) Foreign Application Priority Data

Apr. 21, 2015 (TW) ............................ 104112666 A

(51) Int. Cl.

*G06K 9/00* (2006.01)
*G08B 27/00* (2006.01)
*H04N 17/00* (2006.01)

(52) U.S. Cl.

CPC ....... *G08B 27/005* (2013.01); *G06K 9/00771* (2013.01); *H04N 17/00* (2013.01)

(58) Field of Classification Search

CPC ......... G06T 7/0022; G06T 2207/10016; G06T 2207/30232; G06T 2207/20021; G06T 2207/20076; H04N 7/181; H04N 7/188; G08B 23/00; G08B 27/005

See application file for complete search history.

(56) References Cited

U.S. PATENT DOCUMENTS

2010/0225765 A1 * 9/2010 Kadogawa ............ H04N 7/181 348/159

OTHER PUBLICATIONS

Jun Huo, Chengdong Wu, Zhongjia Yuan, Jiyuan Tan, Qiaoqiao Wang, and Yun Zhou, "Research of Intelligent Home Security Surveillance System Based on ZigBee", 2008 IEEE, pp. 554-557.*

* cited by examiner

*Primary Examiner* — Siamak Harandi

(74) *Attorney, Agent, or Firm* — Rosenberg, Klein & Lee

(57) ABSTRACT

The present invention discloses a distributed automatic notification method for abnormality in remote massive monitors. If a data stream is not available, a disconnect prompt stream is generated. The data stream is converted to a continuous video. Then, the continuous video is divided into a plurality of single-frame images along the time axis, and each single-frame image is divided into a plurality of image grids. A plurality of pixels are next selected from each image grid. According to a plurality of image parameter values corresponding to the plurality of pixels, a statistical value of image grid parameter is calculated. Then whether an image grid is monochromatic can be judged according to the statistical value of image grid parameter. When a plurality of continuous single-frame images are judged to be monochromatic single-frame images, the color of the monochromatic single-frame images can be further judged.

14 Claims, 5 Drawing Sheets

DISTRIBUTED AUTOMATIC NOTIFICATION METHOD FOR ABNORMALITY IN REMOTE MASSIVE MONITORS

FIELD OF THE INVENTION

The present invention relates generally to a distributed automatic notification method for abnormality in remote massive monitors, and particularly to monitoring remote massive monitors by using distributed computing, judging if an image is monochromatic by using statistical method for judging if a monitor is abnormal, and displaying abnormal connection using a monochromatic frame for judging using the same method.

BACKGROUND OF THE INVENTION

The Transparency Market Research, a market research firm in the US, predicted in their formerly published report that the market value of the video surveillance hardware and video surveillance as a service (VSaaS) will reach 42.81 billion dollars in 2019 with a compound annual growth rate (CAGR) of 19.1%. The market value of the video surveillance hardware was 9.48 billion dollars in 2012. Its CAGR between 2013 and 1019 is expected to be 17.3%. The market share of closed-circuit televisions and their memories was 37% of the overall hardware market in 2012, occupying the largest proportion. The next largest market share, 32%, is the internet protocol camera (IP cam) having the cloud functionality. The report also predicted IP cam would be favored by more people in the coming years and will reach around 46% of market share in 2019. Closed-circuit televisions and their memories will gradually lose their market share. This trend shows that the mainstream of modern video surveillance technology is gradually turning to IP-based monitors. Users become accustomed to backupping the video taken by monitors in cloud hard disks progressively and manage the video contents via the cloud.

Nonetheless, as the amount of monitors that surveillance service providers or users need to manage becomes huge increasingly, it is extremely difficult to detect abnormal conditions in monitors real-timely. An efficient surveillance system is required for detecting abnormalities automatically. Accordingly, the present invention provides a distributed automatic notification method for abnormality in remote massive monitors for real-time surveillance on massive monitors using a distributed computing system. The principle is to use statistical tools for analyzing if monochromatic single-frame images appear in the continuous images converted from the data stream of the monitors in order to judge if abnormalities occur.

In addition, when the data stream is not available, namely, when the communication between the surveillance center and the monitors is disconnected, the present invention is designed to generate a disconnect prompt stream automatically. The appearance of monochromatic single-frame image while converting a disconnect prompt stream to continuous video is judged using statistical tools. Then the color of the monochromatic single-frame image is detected for determining the cause, whether a network disconnection or a monitor failure problem, of the monochromatic single-frame image.

Besides, the color of monochromatic single-frame image can be due to natural phenomena. For example, the color of the video taken by a monitor installed in an environment without lighting at night will be black monochromatically black after sunset. The present invention also provides exception configuration for specific monochromatic video color in specific video times for preventing false judgment.

The present invention is applicable to various monitors that edit video data using a real-time streaming format. It can process video of any resolution, detect network abnormality automatically and dynamically, and support dynamic event reminding and history analysis.

SUMMARY

An objective of the present invention is to provide a distributed automatic notification method for abnormality in remote massive monitors. After the data stream acquired from monitors is converted to continuous video, statistical methods are used for analyzing the single-frame image at respective time a monochromatic video. Continuous appearance of single-frame images represents abnormality occurs in monitors.

Another objective of the present invention is to provide a distributed automatic notification method for abnormality in remote massive monitors. When a data stream is not available, the present generates a disconnect prompt stream according to its format. The disconnect prompt stream can be converted to a monochromatic single-frame image with a specific color in the continuous video. By using a statistical method, the existence of the monochromatic single-frame image is judged. Afterwards, its color is further judged. Thereby, the connection abnormality can be judged.

Still another objective of the present invention is to provide a distributed automatic notification method for abnormality in remote massive monitors. The present invention further sets exception configuration including the video time and the color of monochromatic single-frame image. Thereby, the monochromatic frames appeared naturally in specific periods can be excluded automatically and thus preventing false judgment on abnormality of the monitors.

In order to achieve the objectives and efficacies as described above, the present invention discloses a distributed automatic notification method for abnormality in remote massive monitors applicable to a distributed operating system for detecting abnormality in remote massive monitors and automatic notification. First, a data stream is acquired from a monitor. The data stream is converted to a continuous video. Then, the continuous video is divided into a plurality of single-frame images along the time axis, and each single-frame image is divided into a plurality of image grids. A plurality of pixels are next selected from each image grid. According to a plurality of image parameter values corresponding to the plurality of pixels, a statistical value of image grid parameter is calculated. Then whether an image grid is monochromatic can be judged according to the statistical value of image grid parameter. Moreover, according to whether the included plurality of image grids are monochromatic, whether each single-frame image is a monochromatic single-frame image can be determined. When a plurality of continuous single-frame images are judged to be monochromatic single-frame images, the monitor is judged to be abnormal. Hence, an abnormality notification is submitted or the event is recorded in an abnormality database.

The present invention discloses a distributed automatic notification method for abnormality in remote massive monitors applicable to a distributed operating system for detecting abnormality in remote massive monitors and automatic notification. In addition, abnormal connection of monitors can be detected as well. First, it is tried to acquire a data stream from a monitor. When the data stream is not available from the monitor, a disconnect prompt stream is generated according to the format of the data stream and attempts to acquire the data stream from the monitor are repeated. When the data stream is available from the monitor, acquire the data stream, combine the disconnect prompt stream and the data stream, and convert them to a continuous video. The disconnect prompt stream is converted to a plurality of monochromatic single-frame images with the disconnect prompt color. After acquiring the continuous video, each single-frame image is divided into a plurality of image grids. A plurality of pixels are next selected from each image grid. According to a plurality of image parameter values corresponding to the plurality of pixels, a statistical value of image grid parameter is calculated. Then whether an image grid is monochromatic can be judged according to the statistical value of image grid parameter. Moreover, according to whether the included plurality of image grids are monochromatic, whether each single-frame image is a monochromatic single-frame image can be determined. When a plurality of continuous single-frame images are judged to be monochromatic single-frame images, a color of each of the monochromatic single-frame images is determined according to a color parameter value of at least a pixel of the monochromatic single-frame image. If the color is identical to the disconnect prompt color, the connection of the monitor is judged to be abnormal. If not, the monitor is judged to be abnormal.

The present invention discloses a distributed automatic notification method for abnormality in remote massive monitors applicable to a distributed operating system for detecting abnormality in remote massive monitors and automatic notification. First, a data stream is acquired from a monitor. The data stream is converted to a continuous video. Then, the continuous video is divided into a plurality of single-frame images along the time axis, and each single-frame image is divided into a plurality of image grids. A plurality of pixels are next selected from each image grid. According to a plurality of image parameter values corresponding to the plurality of pixels, a statistical value of image grid parameter is calculated. Then whether an image grid is monochromatic can be judged according to the statistical value of image grid parameter. Moreover, according to whether the included plurality of image grids are monochromatic, whether each single-frame image is a monochromatic single-frame image can be determined. When a plurality of continuous single-frame images are judged to be monochromatic single-frame images, a color of each of the monochromatic single-frame images is determined according to a color parameter value of at least a pixel of the monochromatic single-frame image and an video time is judged. If the video time and the color satisfy an exception configuration, the monitor is judged to be normal. If not, the monitor is judged to be abnormal.

DETAILED DESCRIPTION

In order to make the structure and characteristics as well as the effectiveness of the present invention to be further understood and recognized, the detailed description of the present invention is provided as follows along with embodiments and accompanying figures.

The present invention provides a distributed automatic notification method for abnormality in remote massive monitors. The present invention characterized in that after converting the data stream from the monitor to a continuous video, statistical tools are used to analyze if the continuous video contains continuous monochromatic single-frame images for judging if abnormality occurs in the monitor. In addition, if the data stream is not available (when the connection to the monitor is broken), a disconnect prompt stream if generated automatically. The disconnect prompt stream is designed to become monochromatic single-frame images when it is converted to a continuous video. By using the statistical tools to judge occurrence of monochromatic single-frame images, the color of the monochromatic single-frame images is judged. Then whether the monochromatic single-frame images are caused by network disconnection or monitor failure can be determined. Furthermore, the present invention provides an exception configuration for excluding specific monochromatic image colors at specific video times. Thereby, false judgments, such as the black image taken naturally at night, can be avoided.

Figure 1A:
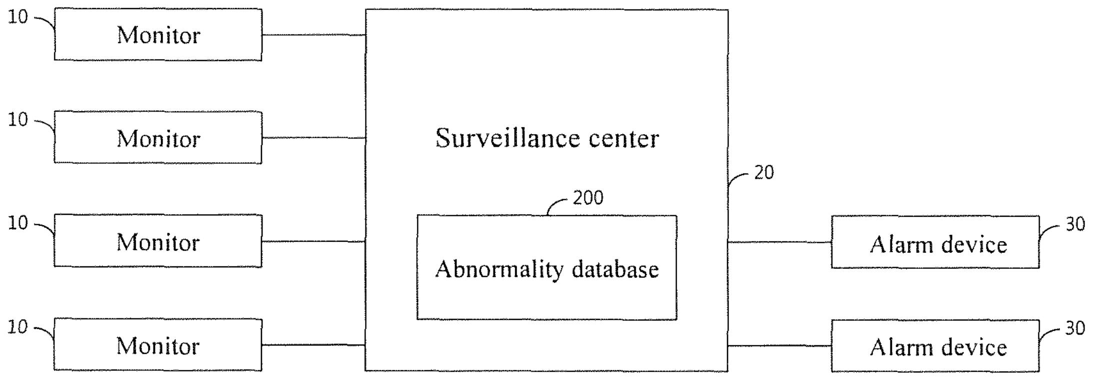
FIG. 1A shows a structural schematic diagram of the system according to a preferred embodiment of the present invention.
Figure 1B:
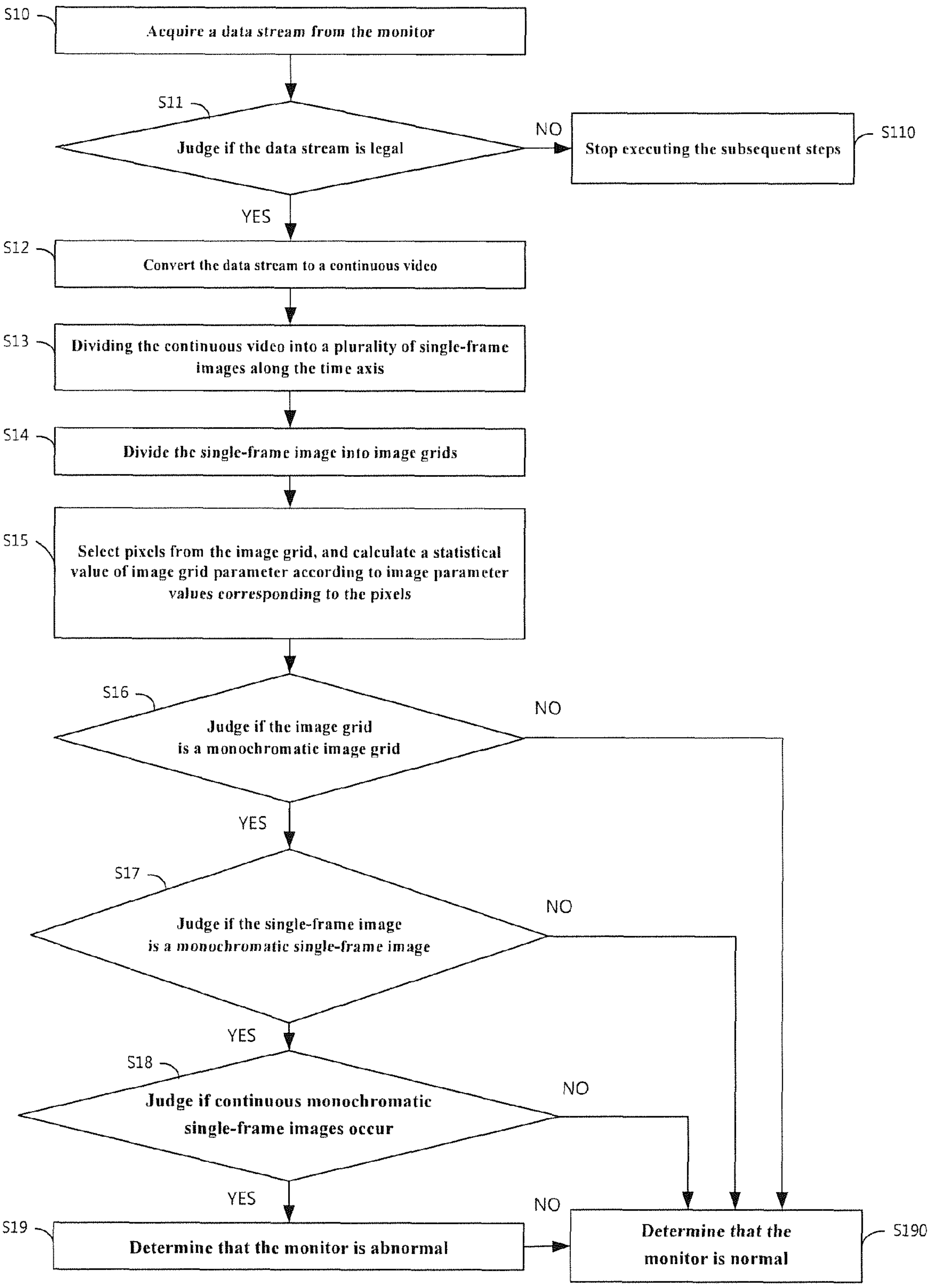
FIG. 1B shows a flowchart of the method according to a preferred embodiment of the present invention.

First, please refer to FIG. 1A and FIG. 1B, which show a structural schematic diagram of the system and a flowchart of the method according to a preferred embodiment of the present invention. As shown in FIG. 1A, the distributed automatic notification method for abnormality in remote massive monitors according to the present invention can be applied to a plurality of monitors 10 and a surveillance center 20. The plurality of monitors 10 are connected to the surveillance center 20, respectively. The surveillance center 20 can be a distributed operating system formed by a plurality of computers and can further comprise an abnormality database 200. In addition, a plurality of alarm devices 30 connected to the surveillance center 20, respectively, can be further included.

As shown in FIG. 1B, the distributed automatic notification method for abnormality in remote massive monitors according to the present invention comprises the following main steps:

Step S10: Acquire a data stream from the monitor;

Step S12: Convert the data stream to a continuous video;

Step S13: Dividing the continuous video into a plurality of single-frame images along the time axis;

Step S14: Divide the single-frame image into image grids;

Step S15: Select pixels from the image grid, and calculate a statistical value of image grid parameter according to image parameter values corresponding to the pixels;

Step S16: Judge if the image grid is a monochromatic image grid;

Step S17: Judge if the single-frame image is a monochromatic single-frame image;

Step S18: Judge if continuous monochromatic single-frame images occur;

Step S19: Determine that the monitor is abnormal; and

Step S190: Determine that the monitor is normal.

In the step S10, the surveillance center 20 acquires a data stream from the plurality of monitors 10, respectively. The surveillance center 20 can connect to the plurality of monitors 10 via a media resource locator (MRL) for acquiring the data streams.

In the step S12, the surveillance center 20 converts the data streams to a continuous video, respectively. The technique for converting a data stream to a video format is well known to a person having ordinary skill in the art. Hence, the details will not be described here.

In the step S13, the surveillance center 20 divides each continuous video into a plurality of single-frame images along a time axis for judging if the plurality of single-frame images are monochromatic single-frame images in the subsequent analysis.

In the step S14, the surveillance center 20 further divide each single-frame image into a plurality of image grids for judging the plurality of image grids are monochromatic in the subsequent analysis. The present invention provides methods for assigning the number of image grids (divided into m*n grids) and the resolution of image grids (divided into image grids having a resolution of x*y). The single-frame images are divided into the plurality of image grids according to the number of image grids or the resolution of image grids set by the user.

In the step S15, the surveillance center 20 selects a plurality of pixels from each image grid and calculates a statistical value of image grid parameter according to a plurality of image parameter values corresponding to the plurality of pixels. According to the present embodiment, the Y value of a YUV value of the plurality of pixels is selected as the plurality of image parameter values. The Y value represents the luminance of the plurality of pixels. Then a statistical method, such as calculating an average value, a variance value, or a standard deviation of the plurality of image parameters, is adopted to give the statistical value of image grid parameter. In addition to the YUV value, the B value in an HSB value of the plurality of pixels can be further selected. The B value represents the brightness of the plurality of pixels and can be used to enhance the accuracy of judging if the image grid is monochromatic. The inventors of the present invention found that by using YUV value and the HSB value together for statistical judgment, the conditions of dusts on the lens of the monitor 10 or mosaic pictures can be detected.

In the step S16, the surveillance center 20 judges if the image grid is monochromatic according to the statistical value of image grid parameter calculated by the plurality of image parameter values of the plurality of pixels. According to an embodiment of the present invention, the judgment can be done by setting a ratio or a threshold value. For example, if the Y values of above 90% of the pixels falls within a positive and a negative values of the average value, the image grid is determined to be a monochromatic image grid.

In the step S16, if the surveillance center 20 judges that the image grid is not monochromatic, the next step, S17, will not be executed. Instead, the step S190 is performed, in which the surveillance center 20 determines that the monitor 10 is normal. Contrarily, if the surveillance center 20 judges in the step S16 that the image grid is monochromatic, the next step, S17, is performed, in which the surveillance center 20 further judges if the single-frame image containing the monochromatic image grid is a monochromatic single-frame image.

In the step S17, the surveillance 20 judges if each single-frame image is a monochromatic single-frame image according to if the plurality of image grids contained in each single-frame image are monochromatic. According to an embodiment of the present invention, the judgment can be done by setting a ratio or a threshold value. For example, if above 90% of the image grids in a single-frame image are judged to be monochromatic, the single-frame image is determined to a monochromatic single-frame image.

In the step S17, if the surveillance center 20 judges that the single-frame image is not a monochromatic single-frame image, the next step, S18, will not be executed. Instead, the step S190 is performed, in which the surveillance center 20 determines that the monitor 10 is normal. Contrarily, if the surveillance center 20 judges in the step S17 that the single-frame image is a monochromatic single-frame image, the next step, S18, is performed, in which the surveillance center 20 further judges if continuous monochromatic single-frame images appear.

In the step S18, the surveillance center 20 judges if a plurality of continuous single-frame images are monochromatic. If so, the step S19 is executed, in which the surveillance center 20 determines that the monitor 10 is abnormal. Next, the surveillance center 20 can further record the abnormal monitor 10 and the time of occurrence in the abnormality database 200, and submit notifications, for example, the push messages of the application programs in mobile devices, SMS message, or emails, to the plurality of alarm devices connected to the surveillance center 20.

Contrarily, in the step S18, if the surveillance center 20 judges that no continuous single-frame image is monochromatic, the step S190 is performed, in which the surveillance center 20 determines that the monitor 10 is normal.

By disposing the above components and executing the steps S10 and S12 to S19/S190, the distributed automatic notification method for abnormality in remote massive monitors according to the present invention can judge if continuous monochromatic single-frame images appear in the continuous video taken by the monitors by using statistical methods. Continuous appearance of single-frame images represents abnormal condition in the monitors. Thereby, the present invention can detect abnormality in the monitors.

Please refer to FIG. 1B, according to the distributed automatic notification method for abnormality in remote massive monitors according to the present invention, after the step S10 and before the step S12, the following steps can be further included:

Step S11: Judge if the data stream is legal; and

Step S110: Stop executing the subsequent steps.

In the step S11, the surveillance center 20 judges if the data stream acquired in the step S10 is legal. If so, the next step, S12, is executed, in which the surveillance center 20 converts the data stream to the continuous video. Contrarily, if the surveillance center 20 judges the data stream is illegal, the step S110 is performed for stopping the subsequent steps. In addition, a notification can be further submitted to the plurality of alarm devices connected to the surveillance center 20 for warning incoming illegal data stream to the surveillance center 20.

By executing the step S11, illegal data streams due to erroneous MRL configuration or attacks on the surveillance center 20 via illegal data streams can be avoided. Besides, the comment and valid lines in the data stream can be separated for preventing errors while converting the data stream to the continuous video in the step S12.

Figure 2A:
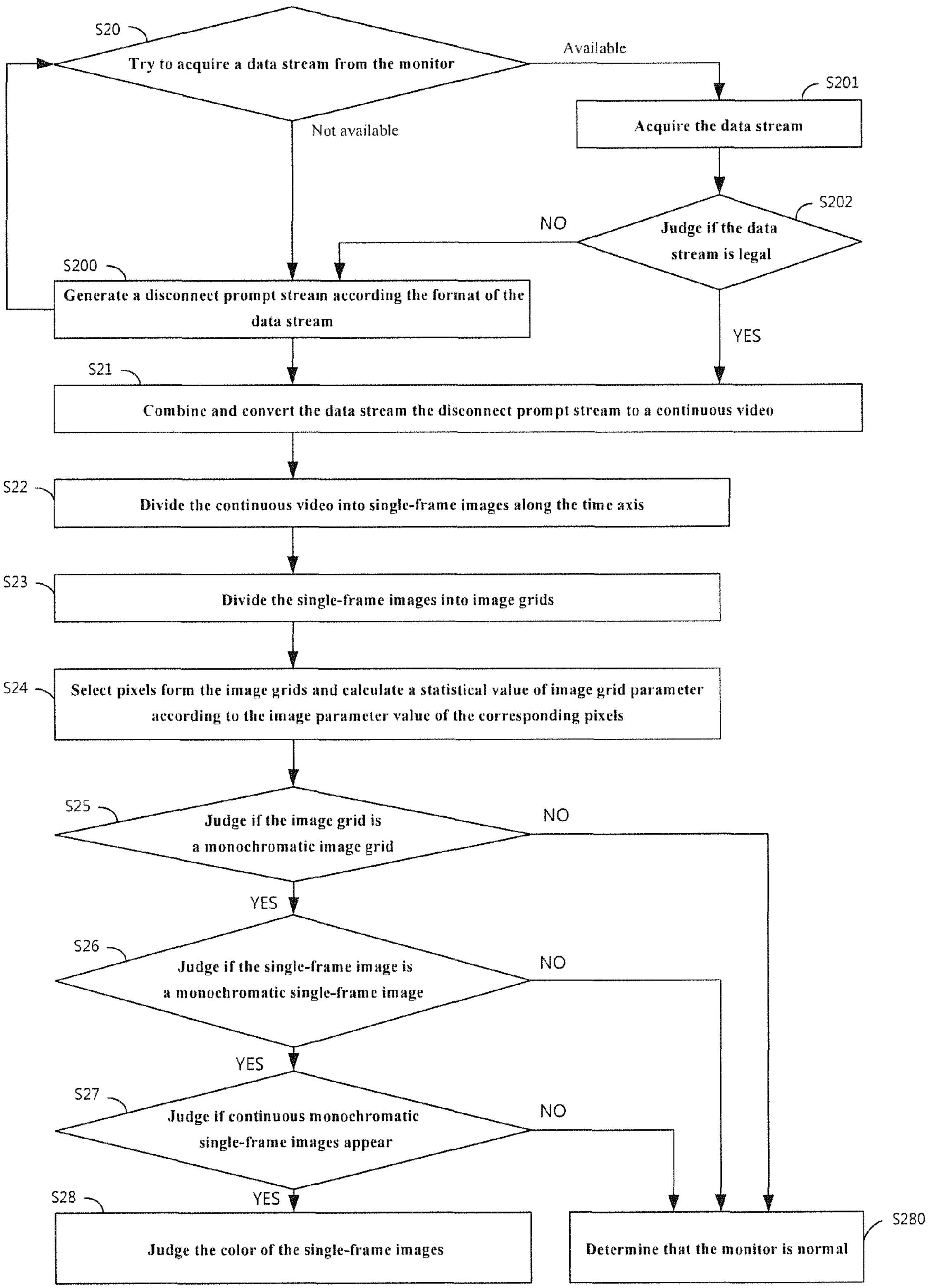
FIG. 2A shows a flowchart 1 of the method according to another preferred embodiment of the present invention.
Figure 2B:
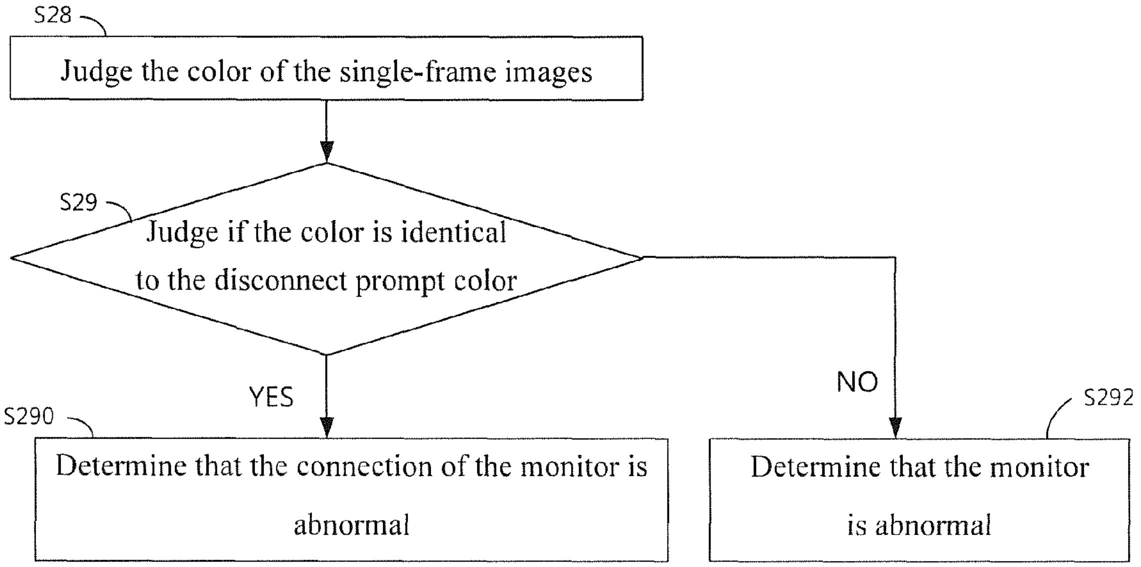
FIG. 2B shows a flowchart 2 of the method according to another preferred embodiment of the present invention.

Please refer to FIG. 1A, FIG. 2A, and FIG. 2B. The latter two show a flowchart 1 and a flowchart 2 of the method according to another preferred embodiment of the present invention. The system structure according to the present embodiment is identical to the one according to the first embodiment. The steps are shown in FIGS. 2A and 2B. The distributed automatic notification of remote massive monitors according to the present invention comprises the following steps:

Step S20: Try to acquire a data stream from the monitor;

Step S200: Generate a disconnect prompt stream according the format of the data stream;

Step S201: Acquire the data stream;

Step S202: Judge if the data stream is legal;

Step S21: Combine and convert the data stream the disconnect prompt stream to a continuous video;

Step S22: Divide the continuous video into single-frame images along the time axis;

Step S23: Divide the single-frame images into image grids;

Step S24: Select pixels form the image grids and calculate a statistical value of image grid parameter according to the image parameter value of the corresponding pixels;

Step S25: Judge if the image grid is a monochromatic image grid;

Step S26: Judge if the single-frame image is a monochromatic single-frame image;

Step S27: Judge if continuous monochromatic single-frame images appear;

Step S28: Judge the color of the single-frame images;

Step S280: Determine that the monitor is normal;

Steps S29: Judge if the color is identical to the disconnect prompt color;

Step S290: Determine that the connection of the monitor is abnormal; and

Step S292: Determine that the monitor is abnormal.

In the step S20, the surveillance center 20 tries to acquire the data stream from the monitor 10. If the data stream is not available, it means the network connection between the surveillance center 20 and the monitor 10 is problematic. After one retrial, the surveillance center 20 determines that the data stream is unavailable. Then the step S200 is executed, in which the surveillance center 20 generates a disconnect prompt stream according to the format of the data stream adopted by the monitor 10. When the disconnect prompt stream is next converted to the continuous video, it becomes a plurality of continuous monochromatic single-frame images formed by a disconnect prompt color. Hence, in the subsequent steps, the statistical methods disclosed in the first embodiment can be used. Meanwhile, the surveillance center 20 continues to try repeatedly to acquire the data stream from the monitor 10.

Contrarily, if the surveillance center 20 judges that the data stream is available, the step S201 is executed, in which the surveillance center 20 acquires the data stream. Then in the step S202, the surveillance 20 judges if the data stream is legal. If so, the next step, S21, is executed, in which the surveillance center 20 combines the data stream and the disconnect prompt stream and converts them to the continuous video. Contrarily, if the surveillance center 20 judges that the data stream is illegal, the data stream is regarded unavailable. In this case, the step S200 is executed.

The step S202 is the same as the step S11 according to the first embodiment. Illegal data streams due to erroneous MRL configuration or attacks on the surveillance center 20 via illegal data streams can be thus avoided. Besides, the comment and valid lines in the data stream can be separated for preventing errors while converting the data stream to the continuous video in the step S21.

In the step S21, the surveillance center 20 combines and converts the data stream and the disconnect prompt stream to a continuous video. The disconnect prompt stream might appear before or after the data stream or between a plurality of data streams for representing the occurrence of network disconnection in the process of trying to acquire the data stream.

The step S22 is identical to the step S13. The surveillance center 20 divides the continuous video into a plurality of single-frame images along the time axis for analyzing if the plurality of single-frame images are monochromatic single-frame images in the subsequent step.

The step S23 is identical to the step S14. The surveillance center 20 further divide each single-frame image into a plurality of image grids according to the number of image grids (divided into m*n grids) or the resolution of image grids (divided into image grids having a resolution of x*y) set by the user.

The step S24 is identical to the step S15. The surveillance center 20 selects a plurality of pixels from each image grid and calculates a statistical value of image grid parameter according to a plurality of image parameter values corresponding to the plurality of pixels. According to the present embodiment, the Y value of a YUV value and the B value of an HSB value of the plurality of pixels are selected as the plurality of image parameter values. Then a statistical method, such as calculating an average value, a variance value, or a standard deviation of the plurality of image parameters, is adopted to give the statistical value of image grid parameter.

The step S25 is identical to the step S16. The surveillance center 20 judges if the image grid is monochromatic according to the statistical value of image grid parameter calculated by the plurality of image parameter values of the plurality of pixels. According to an embodiment of the present invention, the judgment can be done by setting a ratio or a threshold value. For example, if the Y and B values of above 90% of the pixels fall within positive and a negative values of the average values, the image grid is determined to be a monochromatic image grid.

In the step S25, if the surveillance center 20 judges that the image grid is not monochromatic, the next step, S26, will not be executed. Instead, the step S280 is performed, in which the surveillance center 20 determines that the monitor 10 is normal. Contrarily, if the surveillance center 20 judges in the step S25 that the image grid is monochromatic, the next step, S26, is performed, in which the surveillance center 20 further judges if the single-frame image containing the monochromatic image grid is a monochromatic single-frame image.

The step S26 is identical to the step S17. The surveillance 20 judges if each single-frame image is a monochromatic single-frame image according to if the plurality of image grids contained in each single-frame image are monochromatic. According to an embodiment of the present invention, the judgment can be done by setting a ratio or a threshold value. For example, if above 90% of the image grids in a single-frame image are judged to be monochromatic, the single-frame image is determined to a monochromatic single-frame image.

In the step S26, if the surveillance center 20 judges that the single-frame image is not a monochromatic single-frame image, the next step, S27, will not be executed. Instead, the step S280 is performed, in which the surveillance center 20 determines that the monitor 10 is normal. Contrarily, if the surveillance center 20 judges in the step S26 that the single-frame image is a monochromatic single-frame image, the next step, S27, is performed, in which the surveillance center 20 further judges if continuous monochromatic single-frame images appear.

The step S27 is identical to the step S18. The surveillance center 20 judges if a plurality of continuous single-frame images are monochromatic. If so, the step S28 is executed, in which the surveillance center 20 determines a color of the monochromatic single-frame image according to a color parameter value of at least a pixel of each monochromatic single-frame image. Then the next step, S29, is executed for judging if the color is identical to the disconnect prompt color.

If the color is identical to the disconnect prompt color, the step S290 is executed, in which the surveillance center 20 determines that the connection of the monitor 10 is abnormal. Contrarily, if the color is not identical to the disconnect prompt color, the step S292 is performed, in which the surveillance center 20 determines that the monitor 10 is abnormal.

By executing the above steps S20 to S280/S290/S292, the distributed automatic notification method for abnormality in remote massive monitors of the present invention can be used for detecting abnormal connection of the monitor. When an abnormal connection occurs between the surveillance center and the monitor, the disconnect prompt stream is added. Consequently, in the converted continuous video, continuous monochromatic single-frame images formed by the disconnect prompt color appear. Hence, by using the statistical methods, the existence of the continuous monochromatic single-frame images can be judged. Then according to the color of the continuous monochromatic single-frame images, abnormality in the connection of the monitor or in the monitor itself can be determined.

Figure 3:
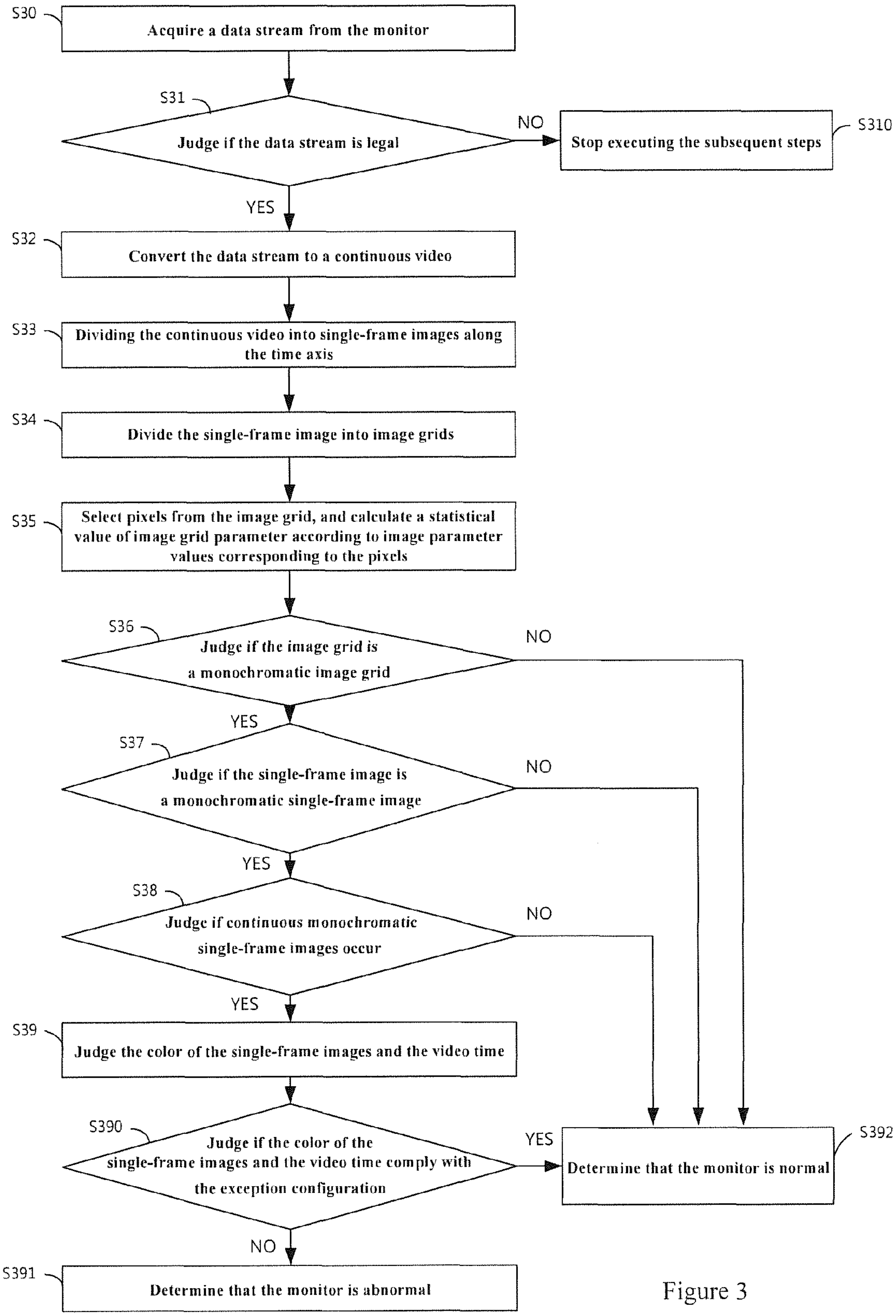
FIG. 3 shows a flowchart of the method according to still another preferred embodiment of the present invention.

Please refer to FIG. 3 along with FIG. 1A. FIG. 3 shows a flowchart of the method according to a third embodiment of the present invention. The system structure adopted by the present embodiment is identical to the one in the first embodiment. The steps are shown in FIG. 3. The distributed automatic notification method for abnormality in remote massive monitors comprises the following steps:

Step S30: Acquire a data stream from the monitor;
Step S31: Judge if the data stream is legal;
Step S310: Stop executing the subsequent steps;
Step S32: Convert the data stream to a continuous video;
Step S33: Dividing the continuous video into single-frame images along the time axis;
Step S34: Divide the single-frame image into image grids;
Step S35: Select pixels from the image grid, and calculate a statistical value of image grid parameter according to image parameter values corresponding to the pixels;
Step S36: Judge if the image grid is a monochromatic image grid;
Step S37: Judge if the single-frame image is a monochromatic single-frame image;
Step S38: Judge if continuous monochromatic single-frame images occur;
Step S39: Judge the color of the single-frame images and the video time; Steps S390: Judge if the color of the single-frame images and the video time comply with the exception configuration;
Step S391: Determine that the monitor is abnormal; and
Step S392: Determine that the monitor is normal.

The step S30 is identical to the step S10. The surveillance center 20 acquires a data stream from the monitor. The surveillance center 20 can connect to the plurality of monitors 10 via an MRL for acquiring the data streams.

The step S31 is identical to the step S11. The surveillance center 20 judges if the data stream acquired in the step S10 is legal. If so, the next step, S32, is executed, in which the surveillance center 20 converts the data stream to the continuous video. Contrarily, if the surveillance center 20 judges the data stream is illegal, the step S310 is performed for stopping the subsequent steps. Thereby, illegal data streams due to erroneous MRL configuration or attacks on the surveillance center 20 via illegal data streams can be avoided. In addition, a notification can be further submitted to the plurality of alarm devices connected to the surveillance center 20 for warning incoming illegal data stream to the surveillance center 20.

The step S32 is identical to the step S12. The surveillance center 20 converts the data stream to a continuous video.

The step S33 is identical to the step S13. The surveillance center 20 divides the continuous video into a plurality of single-frame images along the time axis for analyzing if the plurality of single-frame images are monochromatic single-frame images in the subsequent step.

The step S34 is identical to the step S14. The surveillance center 20 further divide each single-frame image into a plurality of image grids according to the number of image grids (divided into m*n grids) or the resolution of image grids (divided into image grids having a resolution of x*y) set by the user.

The step S35 is identical to the step S15. The surveillance center 20 selects a plurality of pixels from each image grid and calculates a statistical value of image grid parameter according to a plurality of image parameter values corresponding to the plurality of pixels. According to the present embodiment, the Y value of a YUV value and the B value of an HSB value of the plurality of pixels are selected as the plurality of image parameter values. Then a statistical method, such as calculating an average value, a variance value, or a standard deviation of the plurality of image parameters, is adopted to give the statistical value of image grid parameter.

The step S36 is identical to the step S16. The surveillance center 20 judges if the image grid is monochromatic according to the statistical value of image grid parameter calculated by the plurality of image parameter values of the plurality of pixels. According to an embodiment of the present invention, the judgment can be done by setting a ratio or a threshold value.

In the step S36, if the surveillance center 20 judges that the image grid is not monochromatic, the next step, S37, will not be executed. Instead, the step S392 is performed, in which the surveillance center 20 determines that the monitor 10 is normal. Contrarily, if the surveillance center 20 judges in the step S36 that the image grid is monochromatic, the next step, S37, is performed, in which the surveillance center 20 further judges if the single-frame image containing the monochromatic image grid is a monochromatic single-frame image.

The step S37 is identical to the step S17. The surveillance 20 judges if each single-frame image is a monochromatic single-frame image according to the ratio of the monochromatic image grids contained in each single-frame image.

In the step S37, if the surveillance center 20 judges that the single-frame image is not a monochromatic single-frame image, the next step, S38, will not be executed. Instead, the step S392 is performed, in which the surveillance center 20 determines that the monitor 10 is normal. Contrarily, if the surveillance center 20 judges in the step S37 that the single-frame image is a monochromatic single-frame image, the next step, S38, is performed, in which the surveillance center 20 further judges if continuous monochromatic single-frame images appear.

The step S38 is identical to the step S18. The surveillance center 20 judges if a plurality of continuous single-frame images are monochromatic. If so, the step S39 is executed, in which the surveillance center 20 determines a color of the monochromatic single-frame image according to a color parameter value of at least a pixel of each monochromatic single-frame image. Then the next step, S390, is executed for judging if the color and the video time comply with an exception configuration.

If the color and the video time do not comply with the exception configuration, the step S391 is executed, in which the surveillance center 20 judges that the monitor 10 is abnormal. Contrarily, if the color and the video time comply with the exception configuration, the step S392 is executed, in which the surveillance center 20 judges that the monitor 10 is normal. For example, the exception configuration includes the time after sunset and before sunrise and the color is black. By setting the exception configuration, a condition such as the black pictures taken naturally in an area without lighting at night can be excluded for avoiding false judgment of abnormality.

By executing the above steps S30 to S391/S392, the distributed automatic notification method for abnormality in remote massive monitors of the present invention can include the exception configuration for excluding monochromatic images appeared naturally in specific periods and thus preventing false judgment on abnormality of the monitors.

To sum up, the present invention discloses a distributed automatic notification method for abnormality in remote massive monitors applicable to a distributed operating system for detecting abnormality in remote massive monitors and automatic notification. First, a data stream is acquired from a monitor. If the data stream is not available, a disconnect prompt stream is generated. The data stream is converted to a continuous video. Then, the continuous video is divided into a plurality of single-frame images along the time axis, and each single-frame image is divided into a plurality of image grids. A plurality of pixels are next selected from each image grid. According to a plurality of image parameter values corresponding to the plurality of pixels, a statistical value of image grid parameter is calculated. Then whether an image grid is monochromatic can be judged according to the statistical value of image grid parameter. Moreover, according to whether the included plurality of image grids are monochromatic, whether each single-frame image is a monochromatic single-frame image can be determined. When a plurality of continuous single-frame images are judged to be monochromatic single-frame images, the color of the monochromatic single-frame images can be further judged. If the color is identical to the color of the image converted from the disconnect prompt stream, the connection of the monitor is judged to be abnormal. If the color and the video time comply with the exception configuration, the monitor is judged to be normal. Otherwise, the monitor is judged to be abnormal.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A distributed automatic notification method for abnormality in remote massive monitors, comprising steps of:
acquiring a data stream from a monitor;
converting said data stream to a continuous video;
dividing said continuous video into a plurality of single-frame images along the time axis;
dividing each said single-frame image into a plurality of image grids;
selecting a plurality of pixels from each said image grid, and calculating a statistical value of image grid parameter according to a plurality of image parameter values corresponding to said plurality of pixels;
judging if each said image grid is a monochromatic image grid according to said statistical value of image grid parameter;
judging if each said single-frame image is a monochromatic single-frame image according to a plurality of monochromatic image grids; and
determining that said monitor is abnormal when a plurality of continuous single-frame images are judged to be monochromatic single-frame images.

2. The distributed automatic notification method for abnormality in remote massive monitors of claim 1, and after said step of acquiring said data stream from said monitor and before said step of converting said data stream to said continuous video, further comprising steps of:
judging if said data stream is legal;
stopping executing the subsequent steps if said data stream is illegal; and
executing said step of converting said data stream to said continuous video if said data stream is legal.

3. The distributed automatic notification method for abnormality in remote massive monitors of claim 1, and after said step of determining that said monitor is abnormal when a plurality of continuous single-frame images are judged to be monochromatic single-frame images, further comprising a step of judging a color of said monochromatic single-frame image according to a color parameter value of at least a pixel of each said monochromatic single-frame image.

4. The distributed automatic notification method for abnormality in remote massive monitors of claim 1, wherein said plurality of image parameter values are the Y values of the YUV values or the B values of the HSB values of the corresponding pixels, respectively.

5. The distributed automatic notification method for abnormality in remote massive monitors of claim 1, wherein said statistical value of image grid parameter includes an average value, a variance value, or a standard deviation of said plurality of image parameter values.

6. A distributed automatic notification method for abnormality in remote massive monitors, comprising steps of:
acquiring a data stream from a monitor;
generating a disconnect prompt stream according to the format of said data stream and repeatedly acquiring said data stream from said monitor when said data stream is not available from said monitor;
acquiring said data stream from said monitor when said data stream is available from said monitor;
combining and converting said disconnect prompt stream and said data stream to a continuous video and converting said disconnect prompt stream to a plurality of monochromatic single-frame images having a disconnect prompt color;
dividing said continuous video into a plurality of single-frame images along the time axis;
dividing each said single-frame image into a plurality of image grids;
selecting a plurality of pixels from each said image grid, and calculating a statistical value of image grid parameter according to a plurality of image parameter values corresponding to said plurality of pixels;

judging if each said image grid is a monochromatic image grid according to said statistical value of image grid parameter;

judging if each said single-frame image is a monochromatic single-frame image according to a plurality of monochromatic image grids;

judging a color of said monochromatic single-frame image according to a color parameter value of at least a pixel of each said monochromatic single-frame image when a plurality of continuous single-frame images are judged to be monochromatic single-frame images;

determining that the connection of said monitor is abnormal if said color is identical to said disconnect prompt color; and determining that said monitor is abnormal if said color does not comply with said disconnect prompt color.

7. The distributed automatic notification method for abnormality in remote massive monitors of claim 6, and after said step of acquiring said data stream from said monitor if said data stream is available form said monitor and before said step of combining and converting said disconnect prompt stream and said data stream to said continuous video, further comprising steps of:

judging if said data stream is legal;

generating said disconnect prompt stream according to the format of said data stream and repeatedly acquiring said data stream from said monitor if said data stream is illegal; and executing said step of combining and converting said disconnect prompt stream and said data stream to said continuous video if said data stream is legal.

8. The distributed automatic notification method for abnormality in remote massive monitors of claim 6, wherein said plurality of image parameter values are the Y values of the YUV values or the B values of the HSB values of the corresponding pixels, respectively.

9. The distributed automatic notification method for abnormality in remote massive monitors of claim 6, wherein said statistical value of image grid parameter includes an average value, a variance value, or a standard deviation of said plurality of image parameter values.

10. A distributed automatic notification method for abnormality in remote massive monitors, comprising steps of:

acquiring a data stream from a monitor; converting said data stream to a continuous video;

dividing said continuous video into a plurality of single-frame images along the time axis;

dividing each said single-frame image into a plurality of image grids; selecting a plurality of pixels from each said image grid, and calculating a statistical value of image grid parameter according to a plurality of image parameter values corresponding to said plurality of pixels;

judging if each said image grid is a monochromatic image grid according to said statistical value of image grid parameter;

judging if each said single-frame image is a monochromatic single-frame image according to a plurality of monochromatic image grids;

judging a color of said monochromatic single-frame image according to a color parameter value of at least a pixel of each said monochromatic single-frame image when a plurality of continuous single-frame images are judged to be monochromatic single-frame images, and judging a video time;

determining that said monitor is normal if said video time and said color comply with an exception configuration; and determining that said monitor is abnormal if said video time and said color does not comply with said exception configuration.

11. The distributed automatic notification method for abnormality in remote massive monitors of claim 10, and after said step of acquiring said data stream from said monitor and before said step of converting said data stream to said continuous video, further comprising steps of: judging if said data stream is legal; stopping executing the subsequent steps if said data stream is illegal; and executing said step of converting said data stream to said continuous video if said data stream is legal.

12. The distributed automatic notification method for abnormality in remote massive monitors of claim 10, wherein said exception configuration includes that said video time is after a sunset time and before a sunrise time and said color is black.

13. The distributed automatic notification method for abnormality in remote massive monitors of claim 10, wherein said plurality of image parameter values are the Y values of the YUV values or the B values of the HSB values of the corresponding pixels, respectively.

14. The distributed automatic notification method for abnormality in remote massive monitors of claim 10, wherein said statistical value of image grid parameter includes an average value, a variance value, or a standard deviation of said plurality of image parameter values.

* * * * *